United States Patent Office 3,642,714
Patented Feb. 15, 1972

3,642,714
LIGHT STABLE POLYAMIDE HAVING AN IMPROVED RETENTION FOR ACID DYES
Gene C. Weedon and Robert A. Lofquist, Richmond, Va., and Robin B. Mumford, Middletown, N.J., assignors to Allied Chemical Corporation, New York, N.Y.
No Drawing. Filed May 14, 1969, Ser. No. 824,692
Int. Cl. C08g 20/38
U.S. Cl. 260—78 R
16 Claims

ABSTRACT OF THE DISCLOSURE

Acid dye receptive polycarbonamide filaments are prepared by polymerizing the polycarbonamide-forming materials in the presence of 10–50 moles of p-toluenesulfonic acid per $10^6$ gms. of polymer and less than about 50 moles per $10^6$ gms. of a primary-tertiary diamine.

BACKGROUND OF THE INVENTION

This invention relates to modified synthetic linear polycarbonamides having an improved retention for acid dyes and to a process for producing said polycarbonamides.

Synthetic linear polycarbonamide substances useful in the practice of the instant invention are of the general type characterized by high molecular weight, fiber-forming properties and the presence of recurring carbonamide groups as an integral part of the polymer chain, said groups being separated by at least two carbon atoms. Other general characteristics include high melting point, pronounced crystallinity and a high degree of resistance to attack by a wide variety of organic and inorganic materials, except mineral acids, formic acid, and the phenols. Upon hydrolysis with strong mineral acids, the polymers revert to the reactants from which they were formed.

The simple polyamides of this invention can be made by heating a self-polymerizable monoamino-monocarboxylic acid or the lactam thereof in the presence of a suitable accelerator, said lactam being characterized by a chain length of at least 5 carbon atoms between a carboxyl and amino group. The most common polyamides, illustrative of the foregoing, are prepared by condensing ε-caprolactam in the presence of an accelerator, such as ω-aminocaproic acid. This polymerization is usually conducted in the melt, and if desired in the presence of a solvent, such as a phenol. It generally occurs with remarkable smoothness and leads to highly polymeric products applicable for various purposes.

In addition, polyamides useful in the practice of the instant invention can be prepared by heating substantially equimolar proportions of a diamine with a dicarboxylic acid until the product has polymerized to the fiber-forming stage. Suitable diamines may be represented by the general formula $NH_2[CH_2]_nNH_2$ in which $n$ is an integer of 2 or greater and preferably from 2 to 10. Representative examples are ethylenediamine, propylenediamine and hexamethylenediamine. Suitable dicarboxylic acid retactants are represented by the general formula HOOCRCOOH in which R is a divalent hydrocarbon radical having a chain length of at least two carbon atoms. Illustrative dicarboxylic acids include sebacic acid, suberic acid and adipic acid.

While yarns produced from the above polyamides have an affinity for acid dyestuffs, a loss in dye receptivity is attendant with exposure of the yarn to ultraviolet light from any source, including fluorescent. This characteristic is most noticeable in yarns prepared for deep shade dyeing. As a result of exposing undyed yarns to ultraviolet light, streaks and uneven dyeing appear in the dyed fabric. Moreover, it is found that upon ageing, deep dye yarns show a perceptible loss of dyeability, causing streaks in fabrics, carpets and other textile products.

Accordingly, it is the principal object of the present invention to prepare synthetic linear polyamides which dye to substantially even shades when dyed with acid type dyestuffs and resist streaking upon ageing.

Other objects and advantages of the instant invention will become more apparent upon examination of the following more detailed disclosure.

SUMMARY OF THE INVENTION

In accordance with the present invention, deep dyeing, linear polyamides are prepared by heating polyamide-forming reactants in the presence of from about 10 to 50 moles per $10^6$ gms. of polymer of p-toluenesulfonic acid and in the presence of less than about 50 moles per $10^6$ gms. of polymer in a primary-tertiary diamine moiety of the formula

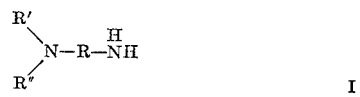

I wherein:

R is a divalent organic group containing up to about 20 carbon atoms;

R′ is selected from the group consisting of aliphatic, alicyclic, and aromatic substituents containing up to about 20 carbon atoms, R″ is selected from the group consisting of aliphatic, alicyclic, and aromatic substituents containing up to about 20 carbon atoms, The simple polyamides useful in the preparation of the deep dyeable polyamides of the invention are of the type having recurring amide groups and carboxyl groups as an integral part of the main polymer chain; wherein said amide and carboxyl groups are separated by at least 2 and preferably at least 5 carbon atoms. They are prepared by procedures well-known in the art and commonly employed in manufacture. For example, ε-caprolactam is reacted in the presence of a small amount of ω-aminocaproic acid at temperatures between 250 and 280° C. under a nitrogen blanket containing no more than about 20 p.p.m. of oxygen, until the desired fiber-forming viscosity is reached. The polymerizate can then be washed, dried and spun into filaments.

Representative examples of a specific moieties of Formula I suitable for purposes of this invention include: diethylamino propylamine, dimethylamino propylamine, diisopropylamino propylamine, N-3 aminopropyl cyclohexylamine.

It is another feature of this invention that polymerization reaction time and the extent of polymerization is controlled in accordance with varying the amount of primary tertiary diamine moiety introduced into the reaction vessel. It is found these moieties tend to react with the carboxyl end-groups of a polyamide chain to block further propagation of the chain. Similarly, polymerization reaction time and the extent of polymerization is controlled in accordance with varying the amount of p-toluene sulfonic acid introduced into the reaction vessel, since it is now found that the acid tends to sequester or protect primary amino end-groups of a polyamide chain blocking further propagation of the chain.

The p-toluenesulfonic acid component or a salt forming derivative thereof can be added to the polymerization reactor vessel with the polyamide-forming reactants or injected during extrusion or, still further, applied as a finish component to filaments prepared from the polymerizate. In the instant procedure, however, we prefer to add the p-toluenesulfonic acid during the polymerization cycle. The primary-tertiary diamine moiety should, however be added initially to the reactor vessel with the polyamide-forming reactants, to achieve the desired melt viscosity within the shortest period of time.

Various additional components may be added to the polyamide-forming reactants either prior to or during polymerization without adversely affecting the improvements of this invention, said ingredients including: stabilizing agents such as manganese compounds, copper compounds and hindered phenols which protect the polymer against adverse effects of heat, ageing, oxidation, and light; reinforcing particles such as silica, and carbon black; adhesion-promoting agents; fluorescent materials and delustering agents such as titanium dioxide.

DESCRIPTION OF THE PREFERRED EMBODIMENTS

The improvement of the instant invention is most advantageously employed in polyamides prepared from ε-caprolactam in the presence of 10–50 moles p-toluenesulfonic acid per $10^6$ gms. of polymer and less than 50 moles of a primary-tertiary diamine per $10^6$ gms. of polymer. Preferred diamines include diethylamino propylamine dimethyl-amino propylamine and di-isopropylamino propylamine; the more preferred diamine being diethylamino propylamine.

It is found that there is an optimum range for the p-toluenesulfonic acid addition which varies with a static number of moles of different diamine components, as such components are herein defined. For example, when about 37.5 moles of the prior art compound aminopropyl morpholine per $10^6$ gms. of polymer are added to the polyamide-forming reactants, the optimum range for the acid addition is 30–50 moles per $10^6$ gms. of polymer; however, when 37.5 moles, as hereinbefore defined, of diethylamino propylamine are added to the reactants, the optimum range for the acid addition is 20–30 equivalents. As a further example, when about 37.5 moles of di-methylamino propylamine are added to the polyamide forming reactants, the optimum range for the p-toluene sulfonic acid addition is 30–40 moles.

The following examples are provided to illustrate the instant invention more fully. They are provided for illustrative purposes only and are not to be construed as limiting the invention, which is defined by the appended claims.

Example 1 (prior art)

Deep dyeing ε-polycaproamide was prepared by charging a beaker with 1520 gms. of ε-caprolactam. Heat was applied to the beaker to form a melt while said beaker was maintained under a nitrogen blanket. To the melt was added: 6.4 gms. of an aqueous 50% titanium dioxide dispersion, 7.61 gms. of aminopropyl morpholine (37.5 moles per $10^6$ gms. of polymer) and 19.84 gms. of an aqueous 50% p-toluenesulfonic acid solution (40 moles per $10^6$ gms. of polymer). The melt was stirred until all the added components dissolved. The dissolved mixture was subsequently charged to a 3 liter, sealed, glass reactor vessel, the vessel being pre-heated to 90° C. After the vessel was charged, 80.0 gms. of ω-aminocaproic acid were added to the vessel with concurrent agitation of the vessel at 30 r.p.m. The charge was maintained under a nitrogen blanket while the temperature of the reactor was raised from 90–255° C. in one hour and maintained at 255° C. until a viscosity of between 55–60, as determined in an aqueous 90% formic acid solution.

The charge was washed and dried to remove unreacted monomer and then spun into 14 filament yarn of 210 denier. The yarn was then knitted into a tube or sleeve of about 3–4 inches in diameter. A section of the sleeve was exposed to ultraviolet light in a xenon arc weatherometer at high humidity conditions (80% RH) at 60° C. for a period of 8½ hrs. The entire sample was then dyed.

In order to accentuate the dye differential between exposed and unexposed yarn, an acid blue-disperse yellow dye system was used for test dyeings. The system was prepared by dispersing 0.05% Celliton yellow GA (Color Index 11855) in an aqueous 0.3% sulfonine acid blue solution, the pH of the resulting system being 7. Using this system, areas with reduced acid dye receptivity are predominantly colored by the disperse yellow dye.

The exposed and unexposed dyed yarn samples were compared with very favorable results. The unexposed sample dyed to a deep blue and the exposed sample dyed, predominantly, to a deep blue color.

Example 2

A deep dyeing ε-polycaproamide was prepared in the same manner as in Example 1 in the presence of 14.88 gms. or 30 moles of p-toluenesulfonic acid rather than 40 moles of amino-propyl morpholine. The same procedures as used in Example 1 were used to test the new sample. The unexposed portion of the sample dyed to a deep blue. The exposed sample had a slightly yellow cast, but was considered desirable in the preparation of textile materials.

Example 3

A deep dyeing ε-polycaproamide was prepared in the same manner as in Example 1 and wherein 6.97 gms. or 37.5 moles of diethylamino propylamine and 9.92 gms. or 20 equivalents of p-toluene sulfonic acid were substituted for 40 moles of p-toluene sulfonic acid and the aminopropyl morpholine component. The same procedures as used in Example 1 were used to test the new sample, however, the same was exposed to ultraviolet light for a period of 4 hours rather than a period of 8½ hours.

The unexposed sample dyed to a deep blue and the exposed sample dyed, predominantly, to a deep blue color.

Example 4

A deep dyeing ε-polycaproamide was prepared in the same manner as in Example 1 and wherein 5.4 gms. or 37.5 moles of dimethylamino propylamine and 14.88 gms. or 30 moles of p-toluene sulfonic acid were substituted for 40 moles of p-toluene sulfonic acid and the aminopropyl morpholine component. The same procedures as used in Example 1 were used to test the new sample, however, the sample was exposed to ultraviolet light for a period of 4½ hours rather than a period of 8½ hours.

The unexposed sample dyed to a deep blue and the exposed sample dyed, predominantly, to a deep blue color.

Example 5

A deep dyeing ε-polycaproamide was prepared in the same manner as in Example 4 and wherein 9.92 gms. or 20 moles of p-toluene sulfonic acid are substituted for 30 moles of the same component. The same procedures as used in Example 4 were used to test the new sample, however, the sample was exposed to ultraviolet light for a period of 5¼ hours, rather than a period of 8½ hours.

The unexposed portion of the sample dyed to a deep blue. The exposed sample had a slightly yellow cast, but was considered desirable in the preparation of textile materials.

Example 6

Deep dyeing polyhexamethylenediamine adipamide nylon 6.6 was prepared by charging an autoclave with 1750 gms. of the salt of hexamethylenediamine and adipic acid, and 1750 cc. of distilled, $CO_2$-free, water. Light stabilizers were added, e.g., manganese salts. Then 9.25 gms. of N-aminopropyl morpholine and 24.10 gms. of a 50% solution of p-toluenesulfonic acid (40 moles per $10^6$ gms. of polymer) were added, followed by a small amount of flush water. The autoclave was closed and purged with nitrogen. The temperature was raised to 134° C. and the pressure was bled off to keep the pressure at 15 p.s.i. Approximately 1200 cc. of distillate came off. When no more water came off at this pressure, the reactor was closed and the temperature raised to 250° C. Any pressure above 250 p.s.i. was bled off. The temperature was raised steadily to 270° C. over the next 90 minutes while the pressure was lowered at the rate of 3 p.s.i. per minute. The polymer was extruded into water, pelletized and spun into yarn having a 210 total denier, comprised of 14 filaments. The yarn was knitted into a sleeve about 3.5 inches in diameter. A section of the sleeve was exposed to xenon light as in Example 1. The sleeve was dyed and evaluated as described in Example 1. The unexposed segment dyed to a deep blue. The exposed segment had a faint yellow cast, but was predominantly deep blue.

The above examples are provided to illustrate the instant invention more fully. They are provided for illustrative purposes only and are not to be construed as limiting the invention, which is defined by the appended claims.

What is claimed is:

1. A fiber-forming saturated aliphatic polycarbonamide having an improved receptivity to acid dyes after exposure to ultraviolet light of said polycarbonamide in an undyed state and said polycarbonamide having recurring amide groups as an integral part of the polymer chain, and wherein said amide groups are separated by at least 2 carbon atoms and consisting essentially of a polyamide composition prepared from a self-polymerizable monoamino-monocarboxylic acid, from about 10 to 50 moles per $10^6$ gms. of polymer of p-toluene sulfonic acid and in the presence of less than about 50 moles per $10^6$ gms. of polymer of a moiety of the formula

                              I wherein:
R is a divalent hydrocarbon group containing up to about 20 carbon atoms;
R' is selected from the group consisting of aliphatic, alicyclic, and aromatic hydrocarbon substituents containing up to about 20 carbon atoms;
R'' is selected from the group consisting of aliphatic, alicyclic, and aromatic hydrocarbon substituents containing up to about 20 carbon atoms.

2. The fiber-forming polycarbonamide of claim 1, wherein the polyamide composition is prepared from a lactam of an amino-acid having a chain of at least 5 carbon atoms between a carboxyl and an amino group.

3. The fiber-forming polycarbonamide of claim 2, wherein the polyamide composition is prepared from ε-caprolactam.

4. The fiber-forming polycarbonamide of claim 3, wherein about 30 moles of p-toluenesulfonic acid are added to the polyamide composition and the moiety of Formula I is

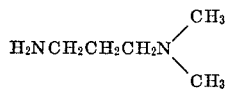

5. The fiber-forming polycarbonamide of claim 3, wherein about 20–30 moles of p-toluenesulfonic acid are added to the polyamide composition and the moiety of Formula I is

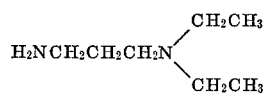

6. The fiber-forming polycarbonamide of claim 3, wherein about 10–15 moles of p-toluenesulfonic acid are added to the polyamide composition and the moiety of Formula I is

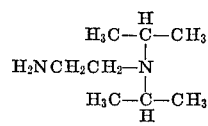

7. A linear polycarbonamide filament having enhanced receptivity to acid dyes after exposure to ultraviolet light of said polycarbonamide in an undyed state, said polycarbonamide having recurring amide groups as an integral part of the polymer chain, and wherein said amide groups are separated by at least 5 carbon atoms, and consisting essentially of a polyamide composition prepared from a self-polymerizable monoamino-monocarboxylic acid, from about 10 to 50 moles per $10^6$ gms. of polymer of p-toluene sulfonic acid and in the presence of less than about 50 moles per $10^6$ gms. of polymer of a moiety of the formula

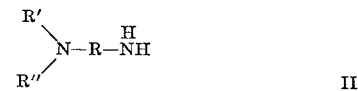
                              II wherein:
R is a divalent hydrocarbon group containing up to about 20 carbon atoms;
R' is selected from the group consisting of aliphatic, alicyclic, and aromatic hydrocarbon substituents containing up to about 20 carbon atoms,
R'' is selected from the group consisting of aliphatic, alicyclic, and aromatic hydrocarbons substituents containing up to about 20 carbon atoms.

8. The filament, as set forth in claim 7, wherein the linear polycarbonamide is prepared from ε-caprolactam.

9. The filament as set forth in claim 8, wherein 10 to 50 moles of sequestering agent per $10^6$ gms. of polymer are incorporated in said polycarbonamide filament and less than about 50 mole of terminating moiety are incorporated in said polycarbonamide.

10. The filament as set forth in claim 9 wherein the terminating moiety is

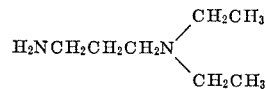

11. The filament as set forth in claim 9 wherein the terminating moiety is

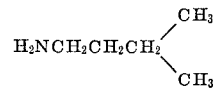

12. The filament as set forth in claim 9 wherein the terminating moiety is

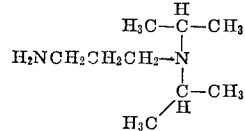

13. A fiber-forming saturated aliphatic polycarbonamide having an improved receptivity to acid dyes after exposure to ultraviolet light of said polycarbonamide in an undyed state and said polycarbonamide having recurring amide groups as an intergral part of the polymer chain and wherein said amide groups are separated by at least two carbon atoms and consisting essentially of a polyamide composition prepared from a self-polymerizable monoamino-monocarboxylic acid, from about 10 to 50 mol per $10^6$ gms. of polymer of p-toluene sulfonic acid and in the presence of about 37.5 to about 50 moles per $10^6$ gms. of polymer of a moiety of a formula

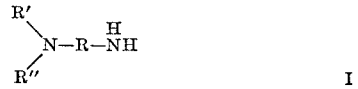
                              I wherein:
R is a divalent hydrocarbon group containing about 20 carbon atoms; and R' and R" are independently selected from the group consisting of aliphatic hydrocarbon substituents containing up to about 20 carbon atoms.

14. The fiber-forming polycarbonamide of claim 13 wherein about 30 moles of p-toluene sulfonic acid are added to the polyamide composition, and the moiety of Formula I is

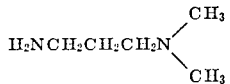

15. The fiber-forming polycarbonamide of claim 13 wherein about 20 to 30 moles of p-toluene sulfonic acid are added to the polyamide composition and the moiety of Formula I is

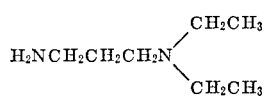

16. The fiber-forming polycarbonamide of claim 13, wherein about 10 to 15 moles of p-toluene sulfonic acid are added to the polyamide composition and the moiety of Formula I is

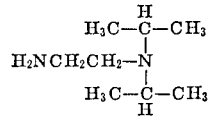

References Cited

UNITED STATES PATENTS

| | | | |
|---|---|---|---|
| 2,585,199 | 2/1952 | Watson | 260—78 |
| 2,765,294 | 10/1956 | England | 260—78 |
| 2,989,798 | 6/1961 | Bannerman | 260—78 |
| 3,065,207 | 11/1962 | Andres | 260—78 |
| 3,128,221 | 4/1964 | Flores | 260—78 |
| 3,235,533 | 2/1966 | Brinkman | 260—78 |
| 3,304,289 | 2/1967 | Ballentine et al. | 260—78 |
| 3,433,853 | 3/1969 | Earle et al. | 260—78 |
| 3,477,899 | 11/1969 | Kubitzek et al. | 260—78 |

HAROLD D. ANDERSON, Primary Examiner

U.S. Cl. X.R.

8—55; 260—78 A, 78 L; 57—140 R

PO-1050
(5/69)

UNITED STATES PATENT OFFICE
CERTIFICATE OF CORRECTION

Patent No. 3,642,714     Dated February 15, 1972

Inventor(s) Gene C. Weedon et al.

It is certified that error appears in the above-identified patent and that said Letters Patent are hereby corrected as shown below:

Column 2, line 31, after "atoms" the "," should be --.--.

Column 4, line 29, "same" should be --sample--.

Column 6, <u>claim 9</u>, line 30, "mole" should be --moles--.

Column 6, <u>claim 11</u>, the formula:

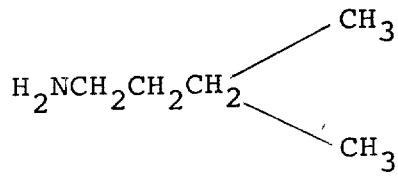

should be:

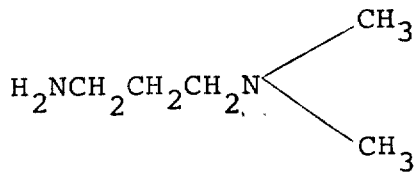

Column 7, <u>claim 13</u>, line 2, "hydrocarbon" should be --hydrocarbons--.

Signed and sealed this 20th day of June 1972.

(SEAL)
Attest:

EDWARD M. FLETCHER, JR.
Attesting Officer

ROBERT GOTTSCHALK
Commissioner of Patents